(12) United States Patent
Diamond et al.

(10) Patent No.: US 12,358,496 B2
(45) Date of Patent: Jul. 15, 2025

(54) COORDINATED VEHICLE MOVEMENT FOR PRESENCE SIMULATION

(71) Applicant: FORD GLOBAL TECHNOLOGIES, LLC, Dearborn, MI (US)

(72) Inventors: Brendan F. Diamond, Grosse Pointe, MI (US); Jonathan Hair, Northville, MI (US); Keith Weston, Canton, MI (US); Stuart C. Salter, White Lake, MI (US); Michael Alan McNees, Flat Rock, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 295 days.

(21) Appl. No.: 18/049,753

(22) Filed: Oct. 26, 2022

(65) Prior Publication Data

US 2024/0140400 A1 May 2, 2024

(51) Int. Cl.
*B60W 30/06* (2006.01)
*B60W 40/02* (2006.01)

(52) U.S. Cl.
CPC ............ *B60W 30/06* (2013.01); *B60W 40/02* (2013.01); *B60W 2556/45* (2020.02)

(58) Field of Classification Search
CPC .. B60W 30/06; B60W 40/02; B60W 2556/45; G08G 1/00; G08G 1/04; G08G 1/14; G08G 1/16
See application file for complete search history.

(56) References Cited

U.S. PATENT DOCUMENTS

| | | | | |
|---|---|---|---|---|
| 10,035,517 | B2* | 7/2018 | Lovett | H04L 67/10 |
| 10,073,463 | B2 | 9/2018 | Smith | |
| 10,078,789 | B2* | 9/2018 | Gupta | G06V 20/586 |
| 11,847,432 | B2* | 12/2023 | Madhugiri | G06V 30/416 |
| 2011/0015934 | A1* | 1/2011 | Rowe | G06Q 50/40 |
| | | | | 340/932.2 |
| 2012/0188101 | A1* | 7/2012 | Ganot | G07B 15/02 |
| | | | | 340/932.2 |
| 2017/0285641 | A1* | 10/2017 | Goldman-Shenhar | |
| | | | | B60W 60/00136 |
| 2017/0329346 | A1* | 11/2017 | Latotzki | G08G 1/202 |
| 2020/0020219 | A1 | 1/2020 | Ashar | |
| 2021/0053556 | A1* | 2/2021 | Murray | G08G 1/146 |

(Continued)

FOREIGN PATENT DOCUMENTS

DE 112020001642 T5 3/2022

*Primary Examiner* — Jonathan M Dager
(74) *Attorney, Agent, or Firm* — Joseph Zane; Brooks Kushman P.C.

(57) ABSTRACT

Parking settings and map data indicative of parking locations in proximity to a structure that are available for the vehicle are maintained to a memory of a vehicle, the parking settings indicating a first time at which the vehicle is to enter an automatic parking mode in which the vehicle moves among the parking locations in proximity to the structure, and a second time at which the vehicle is to exit the automatic parking mode. In the automatic parking mode, responsive to the parking settings indicating an automated parking movement, the parking locations are selected from to determine a parking location into which to move the vehicle and the automated parking movement is performed using a virtual drive system of the vehicle to move the vehicle from a current parked location in proximity to the structure to the determined parking location in proximity to the structure.

25 Claims, 6 Drawing Sheets

(56) References Cited

U.S. PATENT DOCUMENTS

| | | | |
|---|---|---|---|
| 2022/0114893 A1* | 4/2022 | Kim | G08G 1/14 |
| 2022/0148426 A1* | 5/2022 | Longardner | A01M 29/10 |
| 2022/0292971 A1* | 9/2022 | Park | G06V 20/586 |

* cited by examiner

COORDINATED VEHICLE MOVEMENT FOR PRESENCE SIMULATION

TECHNICAL FIELD

Aspects of the disclosure generally relate to defining and executing autonomous vehicle movements in a coordinated fashion to simulate presence of a user at a location.

BACKGROUND

Vehicle-to-everything (V2X) is a type of communication that allows vehicles to communicate with various aspects of the traffic environment surrounding them. This may include communication with other vehicles using vehicle-to-vehicle (V2V) communication and communication with infrastructure using vehicle-to-infrastructure (V2I) communication. Vehicles may include radio transceivers to facilitate the V2X communication. A vehicle may utilize cameras, radios, or other sensor data sources to determine the presence or absence of objects in proximity to the vehicle. In one example, a blind spot monitor may utilize a radio detection and ranging (RADAR) unit to detect the presence or absence of vehicles located to the driver's side and rear, by transmitting narrow beams of high-frequency radio waves through the air and measuring how long it takes for a reflection of the waves to return to the sensor. In another example, a vehicle may utilize light detection and ranging (LIDAR) to build a depth map of objects in the vicinity of the vehicle, by continually firing off beams of laser light and measuring how long it takes for the light to return to the sensor.

SUMMARY

In one or more illustrative examples, a vehicle for simulating user presence is provided. A memory is configured to maintain parking settings and map data indicative of learned parking locations in proximity to a structure. A processor is programmed to, responsive to the parking settings indicating an automated parking movement, select from the learned parking locations to determine a parking location into which to move the vehicle, and perform the automated parking movement using a virtual drive system of the vehicle to move the vehicle from a current parked location in proximity to the structure to the determined parking location in proximity to the structure.

In one or more illustrative examples, a method for simulating user presence by a vehicle is provided. Parking settings and map data indicative of parking locations in proximity to a structure that are available for the vehicle are maintained to a memory of a vehicle, the parking settings indicating a first time at which the vehicle is to enter an automatic parking mode in which the vehicle moves among the parking locations in proximity to the structure, and a second time at which the vehicle is to exit the automatic parking mode after which the vehicle discontinues the moves among the parking locations in proximity to the structure. In the automatic parking mode, responsive to the parking settings indicating an automated parking movement, the parking locations are selected from to determine a parking location into which to move the vehicle and performing the automated parking movement using a virtual drive system of the vehicle to move the vehicle from a current parked location in proximity to the structure to the determined parking location in proximity to the structure.

DETAILED DESCRIPTION

Figure 1:
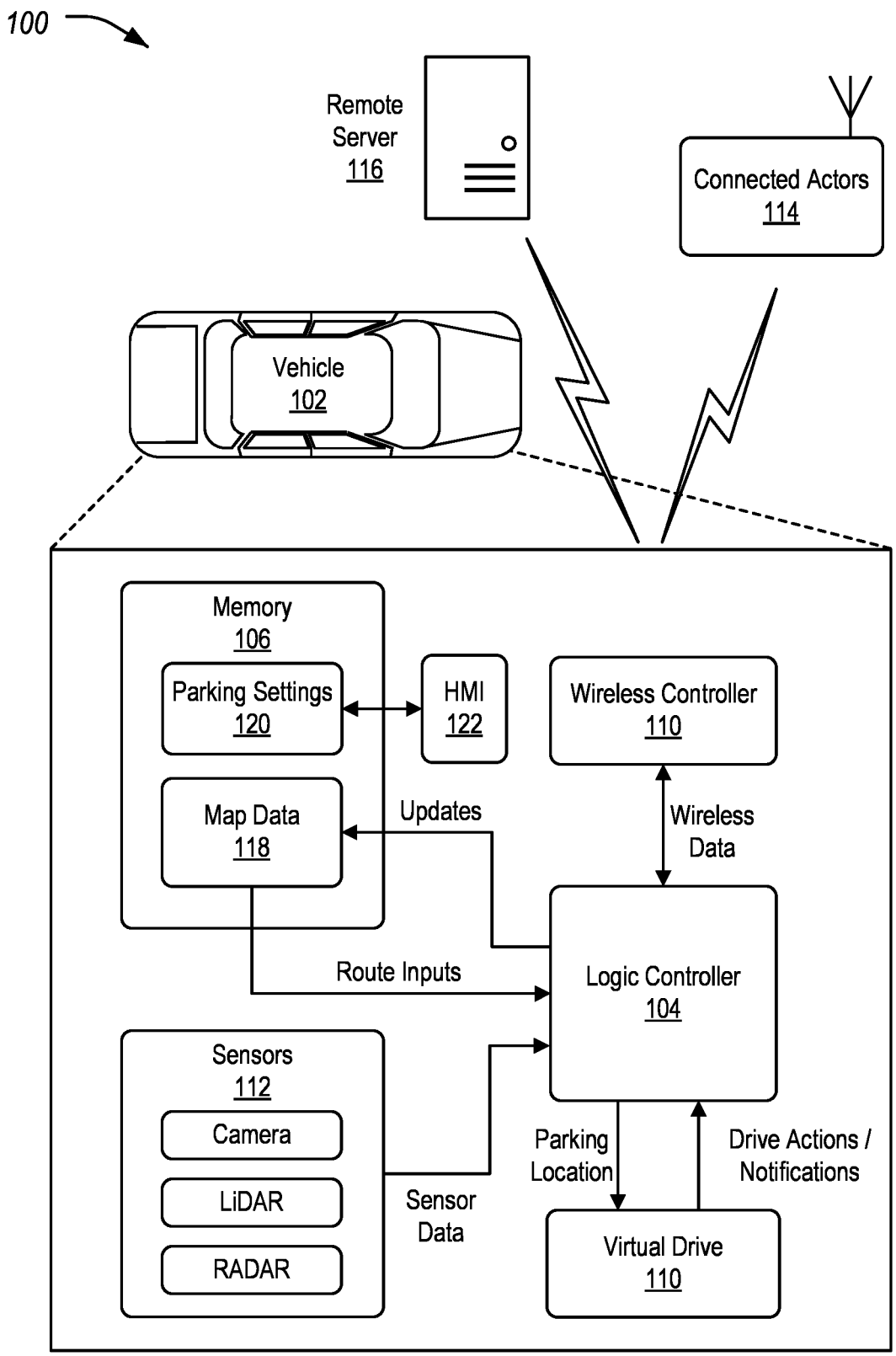
FIG. 1 illustrates an example system for use in automating vehicle movement to simulate user presence.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

When vehicle users go on vacation, often their vehicles are left in their driveway or garage unattended or unmoved. If a snowstorm were to occur, it may be observable to passersby that the vehicle and house are unoccupied. This may be especially true in locations where people vacation during the winter months.

Some vehicles include features that allow for autonomous driving. For instance, some vehicles implement self-parking functionality where the vehicle is able to maneuver into a parking space unattended. This parking may occur via user control from a user's phone or from the vehicle following a pre-mapped trajectory.

This auto-park functionality may be taken advantage of to move the vehicle to simulate the user being home. The vehicle may use the sensor suite (such as RADAR, cameras, LIDAR, etc.) to create a pre-mapped trajectory regarding potential locations of where the vehicle tends to be located. These locations may be mapped while the user is driving or with the aid of an autonomous driving feature. During the mapping, the vehicle may identify turns, paths, contours, edges, and locations of entrances to the house and street.

Based on the locations mapped by the vehicle, the vehicle may move itself between the identified parking locations. For example, the vehicle may choose a randomized parking, movement, orientation, and/or heading to enable the automatic movement of the vehicle to be more realistic in nature. The times of the day in which the vehicle moves may be based on the times of day and/or day of the week where movement at night is likely to be preferred. The user may also select other features, enabling the vehicle to move into the garage during the day and reappear in a driveway in the morning or afternoon to provide the appearance that the vehicle owner is at work. The vehicle may also reference environmental conditions and/or weather reports regarding when additional movements may be useful to perform. For instance, if a snowstorm occurs, the vehicle may move once the snowstorm has cleared. The vehicle may choose to park in the garage to have the snow melt and/or may use wipers to clear off the snow from the windshield.

Before vehicle movement, the sensors of the vehicle may be used to determine if people are in the vicinity of the vehicle. Additionally, the sensors of the vehicle may be used to detect the presence of light from another vehicle. If people are near or other vehicle lights are identified, the vehicle may delay its automatic movement of the vehicle until there are fewer observers to the movement.

V2I communications may be used such that after a vehicle movement occurs, lights or radios in the user's house or other structures may be turned on for specific durations of time. This may be used to simulate corresponding actions in the house or other structures as well. Vehicle movement can be coordinated with neighborhoods rules regarding how long a vehicle can be parked on a street, garbage pick-up times, snowplow times, etc., to ensure the vehicle movement does not result in the vehicle getting towed. Further aspects of the disclosure are discussed in detail herein.

FIG. 1 illustrates an example system 100 for use in automating vehicle movement to simulate user presence. As illustrated, the vehicle 102 include a logic controller 104, a memory 106, a wireless controller 108, a virtual drive system 110, and various sensors 112. These elements may be configured to communicate over dedicated connections or vehicle buses. The wireless controller 108 may be configured to communicate with various connected actors 114, such as pedestrians, smartphones, other vehicles 102, and infrastructure. By using data from the sensors 112, the logic controller 104 may be programmed to maintain an up-to-date map data 118, as well as to use the map data 118 as input for connected applications and to provide drive actions to the virtual drive system 110 and/or notifications to a user via the wireless controller 108. It should be noted that the system 100 shown in FIG. 1 is merely an example, and systems 100 including more, fewer, and different elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery-electric vehicle (BEV) powered one or more electric motors, a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs).

The vehicle 102 may include a logic controller 104 configured to perform and manage various vehicle 102 functions under the power of the vehicle battery and/or drivetrain. The logic controller 104 may include one or more processors configured to execute computer instructions, and may access the memory 106 or other a storage medium on which the computer-executable instructions and/or data may be maintained.

The memory 106 (also referred to as a computer-readable storage, processor-readable medium, or simply storage) includes any non-transitory (e.g., tangible) medium that participates in providing data (e.g., instructions) that may be read by the logic controller 104 (e.g., by its processor(s)). In general, a processor receives instructions and/or data, e.g., from the memory 106 and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Python, JavaScript, Perl, etc. As depicted, the example logic controller 104 is represented as a discrete controller. However, the logic controller 104 may share physical hardware, firmware, and/or software with other vehicle 102 components, such that the functionality of other controllers may be integrated into the logic controller 104, and that the functionality of the logic controller 104 may be distributed across a plurality of logic controller 104 or other vehicle controllers.

Various mechanisms of communication may be available between the logic controller 104 and other components of the vehicle 102. As some non-limiting examples, one or more vehicle buses may facilitate the transfer of data between the logic controller 104 and the other components of the vehicle 102. Example vehicle buses may include a vehicle controller area network (CAN), an Ethernet network, or a media-oriented system transfer (MOST) network.

A wireless controller 108 may include network hardware configured to facilitate communication between the logic controller 104 and other devices of the system 100. For example, the wireless controller 108 may include or otherwise access a cellular modem and antenna to facilitate wireless communication with a wide-area network. The wide-area network may include one or more interconnected communication networks such as a cellular network, the Internet, a cable television distribution network, a satellite link network, a local area network, and a wired telephone network, as some non-limiting examples.

Similar to the logic controller 104, the virtual drive system 110 may include various types of computing apparatus including a memory on which computer-executable instructions may be maintained, where the instructions may be executable by one or more processors (not shown for clarity). Such instructions and other data may be stored using a variety of computer-readable media. In a non-limiting example, the virtual drive system 110 may be configured to direct the performance of various autonomous vehicle commands received from the logic controller 104. For instance, the logic controller 104 may provide commands to the virtual drive system 110 to cause the vehicle 102 to move from a current location to a new location. These commands may include an indication of the new location, and/or a path from the current location to the new location.

The logic controller 104 may receive data from various sensors 112 of the vehicle 102. As some examples, these sensors 112 may include a camera configured to provide image sensor data regarding the surroundings of the vehicle 102, a LiDAR sensor configured to utilize lasers to provide depth information regarding the surroundings of the vehicle 102, and/or RADAR sensors configured to provide object presence information with respect to various areas surrounding the vehicle 102 (e.g., for use in blind spot monitoring).

The sensors 112 may include one or more imaging devices configured to capture sensor data. This sensor data may, for example, be taken of the surroundings of the vehicle 102. The sensor data may be taken with various spatial resolutions (e.g., SD, HD, full-HD, UHD, 4K, etc.), frame rate (15, 24, 30, 60, 120 frames per second, etc.), dynamic ranges (8 bits, 10 bits, 12 bits per pixel per color, etc.), and/or color channels (RGB, monochrome, etc.). Further the sensors 112 may capture information regarding depth, e.g., based on direct and indirect time of flight. Alternatively, the sensors 112 may capture information as a sequence of events. As another example, the sensors 112 may incorporate active illumination to image the area around the vehicle 102 or utilize ambient illumination. In the case of an active illumination camera, a doppler shift of the returned light may be measured to compose the sensor data. To achieve greater coverage of the area surrounding the vehicle 102 for the quantity of sensors 112 used, wide-area sensors 112 may be used having a greater field of view, such as 60 degrees, 100 degrees, or 150 degrees, or even 170 degrees or more.

Figure 2:
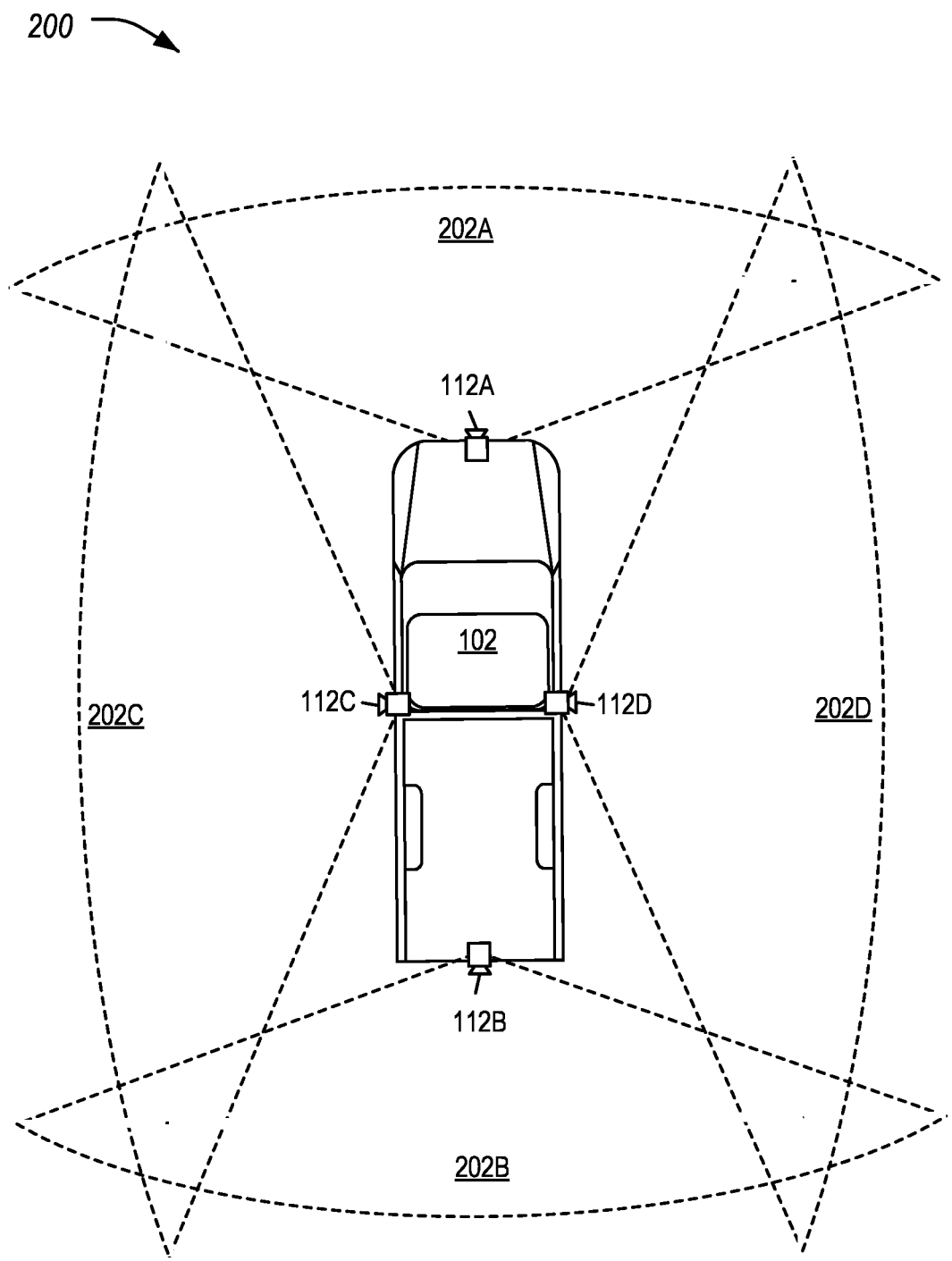
FIG. 2 illustrates an example detail of the sensors of the vehicle.

FIG. 2 illustrates an example 200 detail of the sensors 112 of the vehicle 102. As shown, the sensors 112 may include a front facing camera such as in the grille, a rear facing camera that may also function as a back-up camera, and cameras on either side of the vehicle 102 such as placed in the exterior rear-view mirror areas. More specifically, the example vehicle 102 has four sensors 112: a front-facing sensor 112A having field-of-view 202A, a rear-facing sensor 112B having field-of-view 202B, a left-side sensor 112C having field-of-view 202C, and a right-side sensor 112D having field-of-view 202D. It should be noted that this is only one example, and other arrangements of sensors 112 may be used. In another example, a six sensor 112 approach may further include side-view cameras positioned ahead of the front wheels to provide further information with respect to potential obstacles in front of the front wheels. In yet another example, additional rear-facing sensors 112 may be mounted at other locations, such as behind the cab of a pickup truck above truck bed.

Referring back to FIG. 1, the logic controller 104 may also receive data from connected actors 114, through use of the wireless functionality of the wireless controller 108. For example, the logic controller 104 may receive sensor data from roadside units, relay stations, traffic controls, other vehicles, etc. In another example, the logic controller 104 may receive data from one or more remote servers 116, such as weather information received from a weather server.

Based on the received data from the sensors 112, the logic controller 104 may be programmed to construct and/or update map data 118. The map data 118 may indicate locations where the vehicle 102 may be automatically marked or moved to. The map data 118 may also indicate locations of entrances to structures near which the vehicle 102 may park. These locations may be mapped while the user is driving or with the aid of an autonomous driving feature. During the mapping, the vehicle 102 may identify turns, paths, contours, edges, and locations of the entrances and exits to the structures and street. The map data 118 may be stored to the memory 106, for example.

Figure 3:
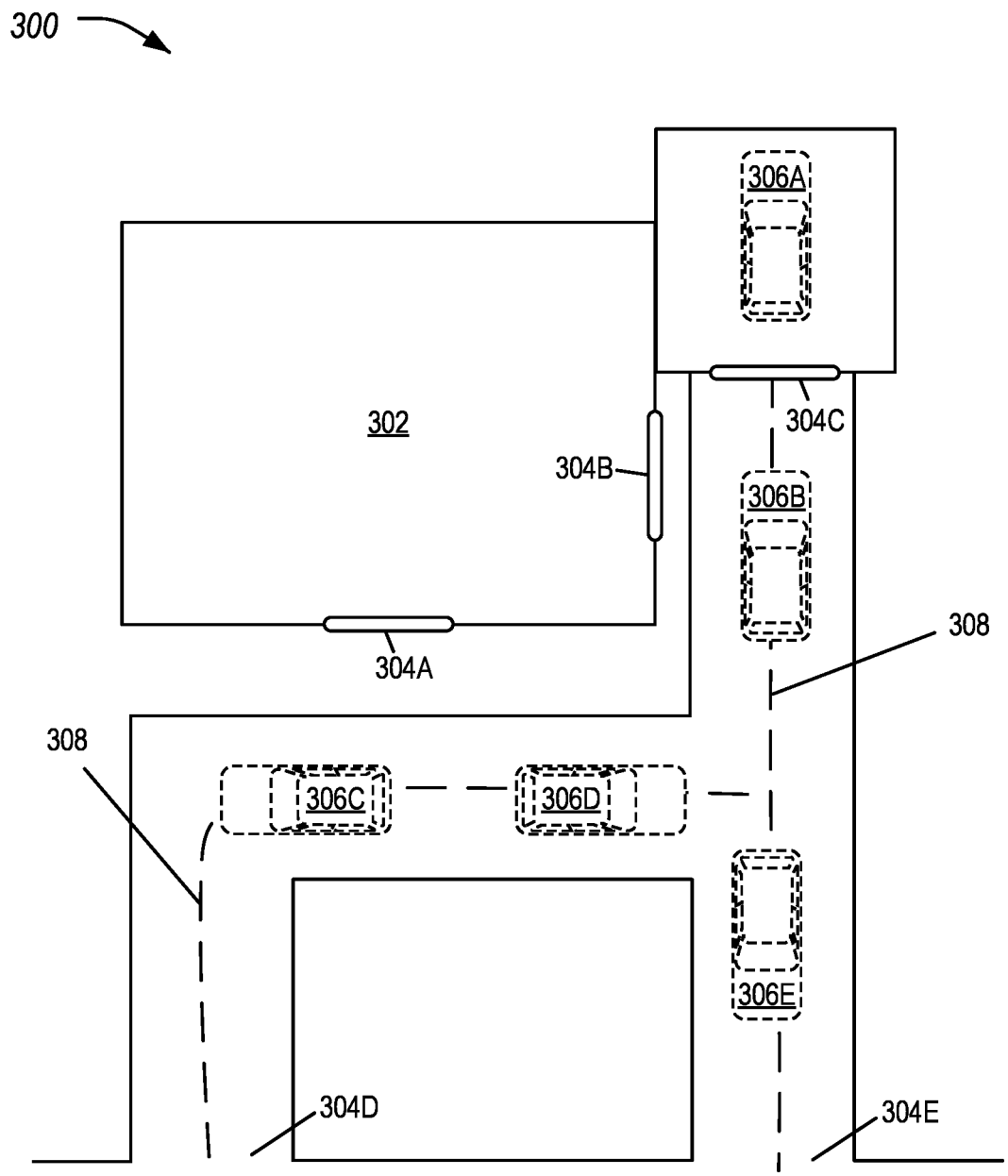
FIG. 3 illustrates an example of the surroundings of a structure as indicated by the map data.

FIG. 3 illustrates an example 300 of the surroundings of a structure 302 as indicated by the map data 118. In an example the structure 302 may be a house, but other types of structures are possible, such as an apartment building, office, shopping mall, etc. As shown, three entrances 304 to the structure 302 are identified by the map data 118: a front door 304A, a side door 304B, and a garage door 304C for the vehicle 102. These may be identified using various image recognition techniques on the data from the sensors 112, for example.

Additionally, two entrances 304 to the roadway are identified, first entrance 304D and second entrance 304E. These may be identified by comparing the vehicle 102 location to geographical data indicating the property boundaries, and/or roadway boundaries in proximity to the structure 302. Or, these may be identified by recording locations traversed by the vehicle 102 when in motion, for example.

Additionally, five parking locations 306 are indicated by the map data 118. These include a first parking location 306A within the garage, a second parking location 306B in the driveway adjacent to the side door 304B, a third parking location 306C in front of the front door 304A, a fourth parking location 306D also in proximity to front of the front door 304A, and a fifth parking location 306E in proximity to the roadway at the second entrance 304E. These may be identified my tracking the locations where the vehicle 102 is moved from a motive mode into a parked mode.

In addition to the parking locations 306, the vehicle 102 may also capture travel paths 308 that are traversed by the vehicle 102 to reach and/or leave the parking locations 306. These travel paths 308 may be recorded using data from the sensors 112, in an example. The travel path 308 may indicate turns, various paths, contours, edges, and the location of the identified entrances 304 to the structure 302 and street. By using the same travel paths 308 that are utilized by the user when manually parking the vehicle 102, the maneuvering of the vehicle 102 to the parking locations 306 may be performed consistent with operation of the vehicle 102 as if the user was present. In one non-limiting example, the same or similar travel paths 308 of the vehicle 102 that are recorded when the user moves into a parking location 306 may be performed by the vehicle 102 to move to that same location.

Referring back to FIG. 1, the memory 106 may be further configured to store parking settings 120. The parking settings 120 may indicate aspects of how to utilize the locations and paths captured in the map data 118 for automating vehicle 102 movement to simulate user presence. The parking settings 120 may include information such as a timeframe for operation of the automatic movement (e.g., days the user will be on vacation), a frequency of movement (e.g., once per day, two times per day, etc.), a list of the locations indicated in the map data 118 that are to be used for the automatic movement (e.g., in front of the front door 304A, in front of the side door 304B, in front of the garage door 304C, etc.), vehicle movement coordination (e.g., randomize the moves from the list of locations, and utilize the list of locations in a predefined order specified by the user, etc.). The parking settings 120 may include other options as well, such as a request to store the vehicle 102 in the garage during the day, and/or a request to move the vehicle 102 into the garage if precipitation such as snow occurs or is forecast. The parking settings 120 may be editable by the user using a human machine interface (HMI) 122 of the vehicle 102. Or, in another example, the parking settings 120 may be editable by a user via the user's smartphone in communication with the wireless controller 108 of the vehicle 102.

Figure 4:
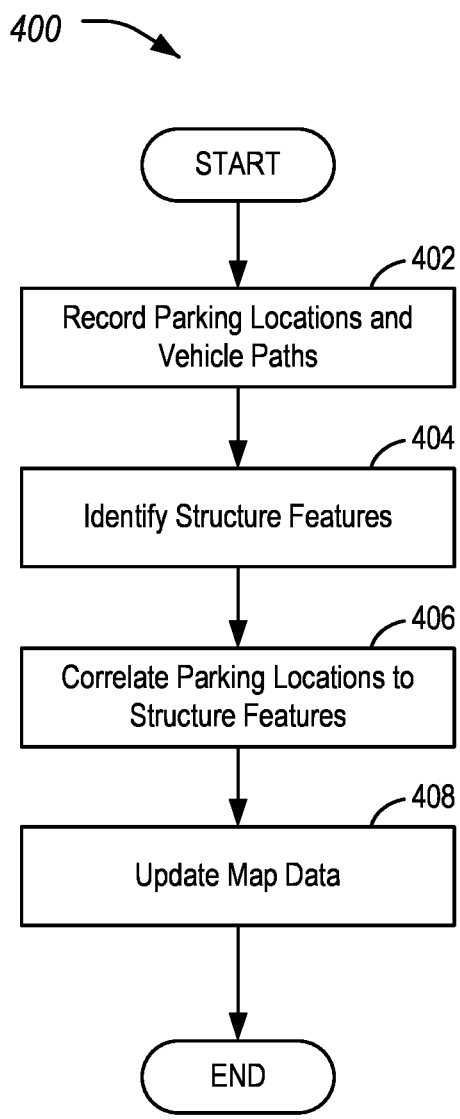
FIG. 4 illustrates an example process for the updating of the map data based on operation of the vehicle.

FIG. 4 illustrates an example process 400 for the updating of the map data 118 based on operation of the vehicle 102. In an example, the process 400 may be performed by the vehicle 102 in the context of the system 100, in relation to a structure 302 such as shown in FIG. 3. The process 400 may be performed based on various conditions. For instance, the process 400 may be performed periodically, such as daily. Or the process 400 may be performed responsive to receipt of a command to update the map data 118. Or the process 400 may be performed on key-off or park, or key-on or moving from park, responsive to the vehicle 102 returning to the structure 302, etc.

At operation 402, the vehicle 102 records vehicle 102 activity in proximity to the structure 302. In an example, the vehicle 102 may utilize the sensors 112 of the vehicle 102 to identify parking locations 306 that the vehicle 102 has been parked at. In addition, the vehicle 102 may utilize the sensors 112 to record the travel paths 308 taken by the vehicle 102 to position the vehicle 102 at those parking locations 306. An example of parking locations 306 and travel paths 308 is shown in FIG. 3.

At operation 404, the vehicle 102 identifies features of the structure 302. In an example, the vehicle 102 may utilize the sensors 112 to identify corresponding features of the structure 302 that relate to the parking locations 306 identified at operation 402. For example, the vehicle 102 may identify whether there are entrances to the structure 302, garage entrances to the structure 302, entrances to the roadway, etc., in proximity to each of the parking locations 306.

At operation 406, the vehicle 102 correlates the parking locations 306 to the identified features of the structure 302. This information may be used to name the parking locations 306, as well as to cluster the parking locations 306 into discrete areas. If a parking location 306 is determined to be in proximity to a garage door 304C, then the parking location 306 may be indicated as being near the garage door 304C. If the parking location 306 is determined to be in proximity to an entrance 304 to the structure 302, then the parking location 306 may be indicated as being near that entrance. If the parking location 306 is determined to be in proximity to the roadway, then the parking location 306 may be indicated as being near the roadway.

At operation 408, the vehicle 102 updates the map data 118. In an example, the vehicle 102 stores the map data 118 to the memory 106 to preserve the identified information with respect to the available parking locations 306. It should be noted that if a cluster of parking locations 306 is determined to be in proximity to an entrance 304 to the structure 302, variations on the clustered parking location 306 may be created by the vehicle 102 that are in different parking locations 306 but a similar distance or different orientation of the vehicle 102 compared from the entrance 304, thereby increasing the variability of the parking locations 306. After operation 408, the process 400 ends.

Figure 5:
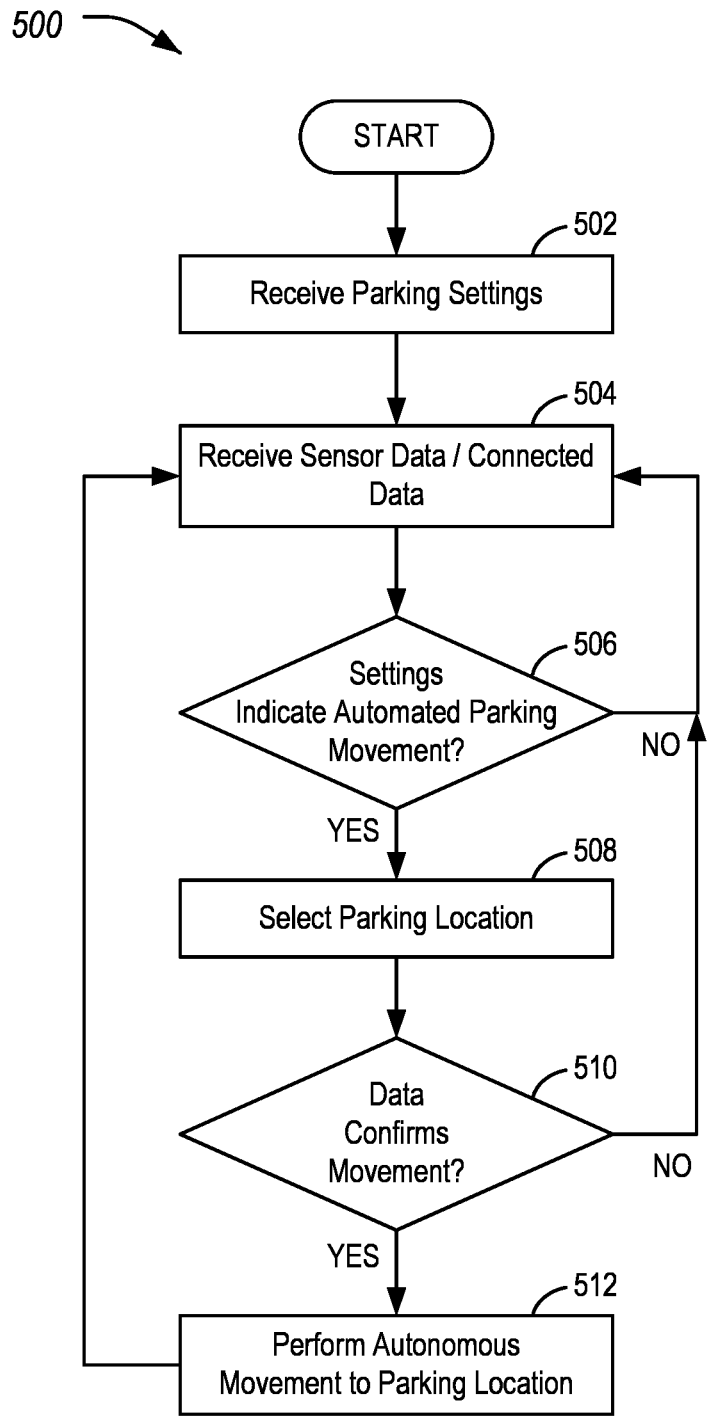
FIG. 5 illustrates an example process for using the map data to perform automatic movements of the vehicle to simulate user presence.

FIG. 5 illustrates an example process 500 for using the map data 118 to perform automatic movements of the vehicle 102 to simulate user presence. In an example, as with the process 400, the process 500 may be performed by the vehicle 102 in the context of the system 100.

At operation 502, the vehicle 102 receives parking settings 120. In an example, the parking settings 120 may be received from a user via the HMI 122 of the vehicle 102. In another example, the parking settings 120 may be received from a user via the user's smartphone in communication with the wireless controller 108 of the vehicle 102. The parking settings 120 may include information such as a timeframe for operation of the automatic movement (e.g., days the user will be on vacation), a frequency of movement (e.g., once per day, two times per day, etc.), a list of the locations indicated in the map data 118 that are to be used for the automatic movement (e.g., in front of the front door 304A, in front of the side door 304B, in front of the garage door 304C, etc.), vehicle movement coordination (e.g., randomize the moves from the list of locations, and utilize the list of locations in a predefined order specified by the user, etc.). The parking settings 120 may include other options as well, such as a request to store the vehicle 102 in the garage during the day, and/or a request to move the vehicle 102 into the garage if precipitation such as snow occurs or is forecast.

At operation 504, the vehicle 102 receives data from the sensors 112 and/or from the wireless controller 108. As some examples, the data received from the sensors 112 may include an image sensor data regarding the surroundings of the vehicle 102, depth information regarding the surroundings of the vehicle 102, and/or object presence information with respect to various areas surrounding the vehicle 102. As some further examples, the data received from the wireless controller 108 may include sensor data from roadside units, relay stations, traffic controls, other vehicles, etc. In another example, data received from the wireless controller 108 may include weather information received from a weather server. The vehicle 102 may also identify current time and/or date information, e.g., that is maintained by a vehicle 102 clock or received via wireless transmissions.

At operation 506, the vehicle 102 determines whether automated vehicle movement to simulate user presence is indicated. In an example, the vehicle 102 may determine whether the current time matches the timeframe for operation of the automatic movement as specified by the parking setting 120. In another example, the vehicle 102 may determine whether the frequency of movement indicates that sufficient time has passed to move the vehicle 102 (e.g., the frequency specified that the vehicle 102 is to move twice a day and 12 hours have passed since the last movement).

In yet another example, the parking settings 120 may indicate specific times for the vehicle 102 to be moved. For instance, the parking setting 120 may specify times for the vehicle 102 to be moved into the garage to simulate the user being at work, and times for the vehicle 102 to be moved again to the driveway to simulate the user being home from work. In yet a further example, the vehicle 102 may determine whether other conditions specified by the parking settings 120 are met. For instance, the vehicle 102 may receive information from a remote server 116 indicating upcoming precipitation, such as a snowstorm.

If a movement is indicated by the parking settings 120, control proceeds to operation 506. Otherwise, control returns to operation 504 to receive further data. It should also be noted that the vehicle 102 may receive updates parking settings 120 at any time, which may transition the process 500 to operation 502 (this control flow not shown in FIG. 5).

At operation 508, the vehicle 102 selects a parking location 306. In an example, the vehicle 102 may utilize the parking settings 120 to identify the parking location 306 where the vehicle 102 is to be moved using the virtual drive system 110. In one example, the parking settings 120 may indicate a rotation of parking locations 306 and the vehicle 102 may select the next parking location 306 in the rotation. In another example, the parking settings 120 may indicate that random selection is to be made among the available parking locations 306. In yet another example, the parking settings 120 may indicate a parking location 306 corresponding to the current time to which the vehicle 102 is to be moved (e.g., into the garage during work hours, out of the garage after work hours, etc.).

At operation 510, the vehicle 102 confirms whether the movement can be performed. In an example, the vehicle 102 may confirm that the received data at operation 504 allows for the movement to be performed. For instance, the vehicle 102 may confirm that there no other vehicles or pedestrians in the vicinity to observe the movement to the new location (e.g., that may see that the vehicle 102 is not being driven).

In another example, the vehicle 102 may confirm that there are no obstructions along the travel path 308 that would prevent the vehicle 102 from moving to the parking location 306. If the movement is confirmed, control passes to operation 512. Otherwise, control returns to operation 504. If control returns to operation 504, a proposed movement may again be attempted at a later time.

At operation 512, the vehicle 102 performing the autonomous vehicle movement to the parking location 306. In an example, the vehicle 102 utilizes the virtual drive system 110 to move the vehicle 102 along the travel path 308 to the new parking location 306. After operation 512, control proceeds to operation 504.

Variations on the discloses approaches may be possible. In an example, V2I communication may be used from the vehicle 102 using the wireless controller 108 such that after an automated movement of the vehicle 102 is performed, lights/radios or other electronics devices in structure 302 may be turned on for specific durations of time to simulate user activity.

In another variation, the automated movement of the vehicle 102 to different parking locations 306 may be coordinated with neighborhoods rules regarding how long a vehicle 102 may be parked on a street, to move the vehicle 102 away from areas where the vehicle 102 may be interfere with garbage pickup times, move the vehicle 102 away from areas where the vehicle 102 snowplow times, etc.

Figure 6:
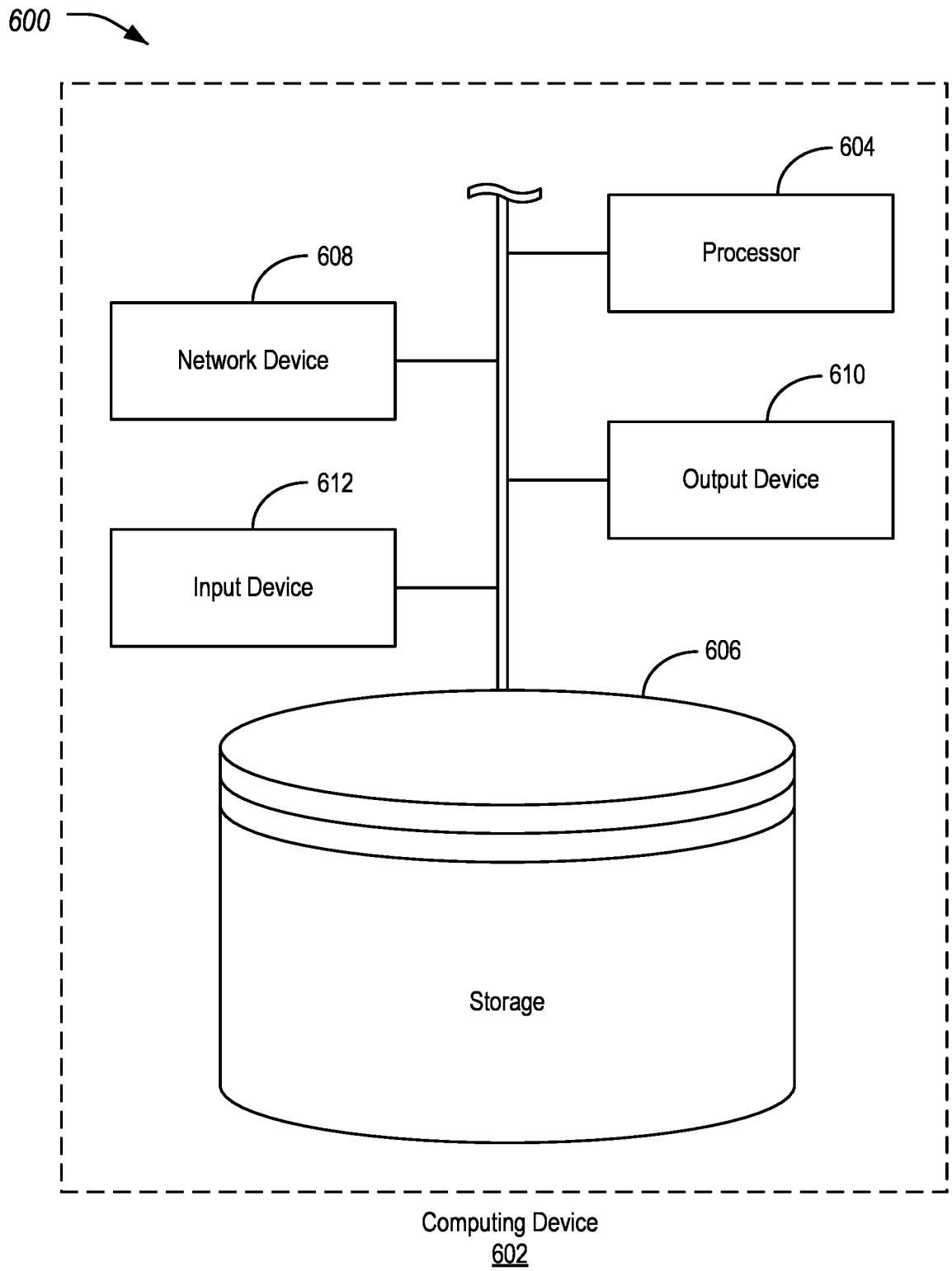
FIG. 6 illustrates an example of a computing device for use in performing automatic movements of the vehicle to simulate user presence.

FIG. 6 illustrates an example 600 of a computing device 602 for use in performing automatic movements of the vehicle to simulate user presence. Referring to FIG. 6, and with reference to FIGS. 1-5, the vehicles 102, logic controller 104, wireless controller 108, virtual drive system 110, sensors 112, connected actors 114, remote servers 116, HMI 122, etc., may include examples of such computing devices 602. As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may optionally include other components such as, for example, the storage 606 and the network device 608 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable the vehicles 102, wireless controller 108, connected actors 114, and remote servers 116 to send and/or receive data from external devices over networks (such as the communications network). Examples of suitable network devices 608 include an Ethernet interface, a Wi-Fi transceiver, a cellular transceiver, a satellite transceiver, a V2X transceiver, a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle for simulating user presence, comprising:
  a memory configured to maintain parking settings and map data indicative of learned parking locations in proximity to a structure;
  a plurality of sensors to capture sensor data with respect to surroundings of the vehicle; and a processor programmed to
  record, based on the sensor data, the parking locations and vehicle paths traversed by the vehicle to the parking locations,
  identify features of the structure in proximity to the parking locations,
  correlate the parking locations to the features,
  update the map data to indicate the parking locations,
  responsive to the parking settings indicating an automated parking movement, select from the parking locations to determine a parking location of the learned parking locations to move the vehicle into, and
  perform the automated parking movement using a virtual drive system of the vehicle to move the vehicle, from a current parked location in proximity to the structure, to the determined parking location in proximity to the structure.

2. The vehicle of claim 1, wherein the parking settings indicate:
  a first time at which the vehicle is to enter an automatic parking mode in which the vehicle moves among the parking locations in proximity to the structure, and
  a second time at which the vehicle is to exit the automatic parking mode after which the vehicle discontinues the moves among the parking locations in proximity to the structure.

3. The vehicle of claim 2, wherein the parking settings indicate a frequency of movement indicating how often the vehicle is to move when in the automatic parking mode.

4. The vehicle of claim 1, wherein the parking settings indicate a scheduled time at which the vehicle is scheduled to move.

5. The vehicle of claim 1, wherein the parking settings indicate the parking location into which to move the vehicle at the time.

6. The vehicle of claim 1, wherein the parking settings indicate for the processor to perform a random selection from the parking locations of the parking location into which to move the vehicle.

7. The vehicle of claim 1, wherein the parking settings indicate for the processor to perform a random selection of vehicle orientation in the parking locations.

8. The vehicle of claim 1, wherein the parking settings indicate that the vehicle is to be parked in a garage responsive to occurrence of precipitation, and the processor is programmed to:
  move the vehicle into the garage responsive to receiving an indication of the precipitation from a weather server; and
  move the vehicle out of the garage responsive to receiving an indication of termination of the precipitation from the weather server.

9. The vehicle of claim 1, wherein the features of the structure include entrances to the structure, and/or entrances to a roadway in proximity to the structure.

10. The vehicle of claim 9, wherein the processor is further programmed to receive the parking settings from a human machine interface (HMI) in communication with the processor, wherein the parking locations are indicated in the HMI as being named according to the features.

11. The vehicle of claim 1, wherein the processor is further programmed to change a state of one or more lights of the structure responsive to moving the vehicle to the determined parking location.

12. A method for simulating user presence by a vehicle, comprising:
  maintaining parking settings and map data indicative of parking locations in proximity to a structure that are available for the vehicle, the parking settings indicating a first time at which the vehicle is to enter an automatic parking mode where the vehicle autonomously moves among the parking locations, and a second time at which the vehicle is to exit the automatic parking mode after which the vehicle discontinues the moves among the parking locations;
  recording, based on sensor data received from a plurality of sensors of the vehicle, the parking locations and vehicle paths traversed by the vehicle to the parking locations;
  identifying features of the structure in proximity to the parking locations, the features including entrances to the structure, and/or entrances to a roadway in proximity to the structure;
  correlating the parking locations to the features;
  updating the map data to indicate the parking locations; and
  receiving the parking settings from a human machine interface (HMI), the parking locations being indicated in the HMI as being named according to the features; and
  in the automatic parking mode, responsive to the parking settings indicating an automated parking movement, selecting from the parking locations to determine a parking location into which to move the vehicle and performing the automated parking movement using a virtual drive system of the vehicle to move the vehicle, from a current parked location in proximity to the structure, to the determined parking location in proximity to the structure.

13. The method of claim 12, wherein the parking settings indicate a frequency of movement indicating how often the vehicle is to move when in the automatic parking mode.

14. The method of claim 12, wherein the parking settings indicate a scheduled time at which the vehicle is scheduled to move.

15. The method of claim 14, wherein the parking settings indicate the parking location into which to move the vehicle at the scheduled time.

16. The method of claim 12, wherein the parking settings indicate for the vehicle to perform one or more of:
  a random selection from the parking locations of the parking location into which to move the vehicle; or
  a random selection of vehicle orientation in the parking locations.

17. The method of claim 12, wherein the parking settings indicate that the vehicle is to be parked in a garage responsive to occurrence of precipitation, and further comprising:
  moving the vehicle into the garage responsive to receiving an indication of the precipitation from a weather server; and
  moving the vehicle out of the garage responsive to receiving an indication of termination of the precipitation from the weather server.

18. The method of claim 12, further comprising changing a state of one or more lights of the structure responsive to moving the vehicle to the determined parking location.

19. A non-transitory computer-readable medium comprising instructions that, when executed by one or more processors of a vehicle, cause the vehicle to perform operations including to:
  maintain parking settings and map data indicative of parking locations in proximity to a structure that are available for the vehicle, the parking settings indicating a first time at which the vehicle is to enter an automatic parking mode where the vehicle autonomously moves among the parking locations, and a second time at which the vehicle is to exit the automatic parking mode after which the vehicle discontinues the moves among the parking locations;

record, based on sensor data received from a plurality of sensors of the vehicle, the parking locations and vehicle paths traversed by the vehicle to the parking locations;

identify features of the structure in proximity to the parking locations, the features including entrances to the structure, and/or entrances to a roadway in proximity to the structure;

correlate the parking locations to the features;

update the map data to indicate the parking locations; and receive the parking settings from a human machine interface (HMI), the parking locations being indicated in the HMI as being named according to the features; and in the automatic parking mode, responsive to the parking settings indicating an automated parking movement, select from the parking locations to determine a parking location into which to move the vehicle and performing the automated parking movement using a virtual drive system of the vehicle to move the vehicle, from a current parked location in proximity to the structure, to the determined parking location in proximity to the structure.

20. The non-transitory computer-readable medium of claim 19, wherein the parking settings indicate a frequency of movement indicating how often the vehicle is to move when in the automatic parking mode.

21. The non-transitory computer-readable medium of claim 19, wherein the parking settings indicate a scheduled time at which the vehicle is scheduled to move.

22. The non-transitory computer-readable medium of claim 21, wherein the parking settings indicate the parking location into which to move the vehicle at the scheduled time.

23. The non-transitory computer-readable medium of claim 19, wherein the parking settings indicate for the vehicle to perform one or more of:
 a random selection from the parking locations of the parking location into which to move the vehicle; or
 a random selection of vehicle orientation in the parking locations.

24. The non-transitory computer-readable medium of claim 19, wherein the parking settings indicate that the vehicle is to be parked in a garage responsive to occurrence of precipitation, and further comprising instructions that, when executed by the one or more processors of a vehicle, cause the vehicle to perform operations including to:
 move the vehicle into the garage responsive to receiving an indication of the precipitation from a weather server; and
 move the vehicle out of the garage responsive to receiving an indication of termination of the precipitation from the weather server.

25. The non-transitory computer-readable medium of claim 19, further comprising instructions that, when executed by the one or more processors of a vehicle, cause the vehicle to perform operations including to change a state of one or more lights of the structure responsive to moving the vehicle to the determined parking location.

* * * * *